United States Patent [19]

Gmeiner et al.

[11] Patent Number: 5,038,085
[45] Date of Patent: Aug. 6, 1991

[54] METHOD FOR CONTROLLING ADJUSTMENT DEVICES OF A MOTOR VEHICLE SEAT FOR ADJUSTMENT OF THE SEAT

[75] Inventors: Günter Gmeiner, Sindelfingen; Karl-Heinz Krieg, Eberbasch; Peter Griesbach, Ostelsheim, all of Fed. Rep. of Germany

[73] Assignee: Daimler-Benz AG, Fed. Rep. of Germany

[21] Appl. No.: 503,918

[22] Filed: Apr. 4, 1990

[30] Foreign Application Priority Data

Apr. 4, 1989 [DE] Fed. Rep. of Germany ....... 3910778

[51] Int. Cl.$^5$ .............................................. H02P 3/00
[52] U.S. Cl. .................................. 318/282; 318/286; 318/648
[58] Field of Search ................... 318/282-286, 318/466, 568.16, 615, 625, 626, 648, 652, 647, 467, 468, 458, 603, 103, 49, 50

[56] References Cited

U.S. PATENT DOCUMENTS

| | | | |
|---|---|---|---|
| 4,404,632 | 9/1983 | Harada et al. | 318/466 |
| 4,456,861 | 6/1984 | Ratzel et al. | 318/568 |
| 4,523,136 | 6/1985 | Dudeck et al. | 318/466 |
| 4,547,718 | 10/1985 | Ratzel et al. | 318/568 |
| 4,659,145 | 4/1987 | Obersteiner | 318/568 |
| 4,813,721 | 3/1989 | Mora | 318/466 |

FOREIGN PATENT DOCUMENTS

| | | |
|---|---|---|
| 2933039 | 2/1981 | Fed. Rep. of Germany . |
| 3003423 | 8/1981 | Fed. Rep. of Germany . |
| 3137150 | 4/1983 | Fed. Rep. of Germany . |
| 0191272 | 2/1985 | Fed. Rep. of Germany . |

Primary Examiner—William M. Shoop, Jr.
Assistant Examiner—A. Jonathan Wysocki
Attorney, Agent, or Firm—Evenson, Wands, Edwards, Lenahan & McKeown

[57] ABSTRACT

A method controls adjustment devices of a motor vehicle seat. The devices are assigned to the longitudinal movement of the seat and the tilting movement of the seat back and are activated by positioning switching elements to move the motor vehicle seat into predetermined set positions. A switching device corresponding with the seat back blocks the associated adjustment device before the seat back runs into an obstacle lying in its range of adjustment. In order to optimize the motion sequences when a rearward tilting movement of the seat back is initiated by one positioning switching element, shortly before the seat back runs into the obstacle, the adjustment device is blocked from further tilting movement of the seat back and a longitudinal movement of the seat forward is automatically initiated by the switching device. The seat back thereby moves out of the switching range of the switching device again, and, in addition to the longitudinal movement of the seat, the rearward tilting movement of the seat back is also continued again, either until the next time blocking occurs or until the set lowered position of the seat back is reached, in which position the longitudinal movement of the seat is then also stopped.

5 Claims, 2 Drawing Sheets

METHOD FOR CONTROLLING ADJUSTMENT DEVICES OF A MOTOR VEHICLE SEAT FOR ADJUSTMENT OF THE SEAT

BACKGROUND AND SUMMARY OF THE INVENTION

The invention relates to a method for controlling adjustment drives of a motor vehicle seat for longitudinal and tilting movement of the seat and, more particularly, to a vehicle seat positioning control method utilizing positioning switching elements and a switching device corresponding with the seat back to block an associated adjustment device before the seat back runs into an obstacle in its adjustment range.

A device for carrying out a method for controlling a vehicle seat is already disclosed in DE-OS 3,137,150. A blocking logic is provided in the control of at least two adjustment devices for adjustment of the inclination of the seat back and the longitudinal position of the seat. In the case of simultaneous movements of the two adjustment devices for the purpose of adjusting the motor vehicle seat into the recumbent position or out of the recumbent position, the logic prevents it from being jammed. This is accomplished by virtue of the fact that, when the inclination of the seat back falls below a specified value, the adjustment devices approach their position in succession. Irrespective of the fact that successive activation of the adjustment devices is only possible for the inclination of the seat back at the predetermined angle, this method, on one hand, entails long adjustment times and, on the other hand, the range of adjustment of the seat back is considerably restricted.

It is an object of the present invention to provide a controlling method of the aforementioned type which permits an optimum sequence of motions when there is an obstacle within the range of adjustment of the seat back.

This object is achieved using a method in which, among other things, with rearward tilting movement of the seat back initiated by a positioning element and shortly before the seat back runs into the obstacle with the blocking of the adjustment device for a further tilting movement of the seat back, a longitudinal movement of the seat forward is automatically initiated by a switching device again and, in addition to the longitudinal movement of the seat, rearward tilting movement is also continued again either until the next time blocking occurs or until the set lowered position of the seat back is reached.

BRIEF DESCRIPTION OF THE DRAWINGS

These and further aspects, objects and advantages of the present invention will become more apparent from the following detailed description of a preferred embodiment in accordance with the present invention when taken in conjunction with the accompanying drawings wherein.

DETAILED DESCRIPTION OF THE DRAWINGS

Figure 1:
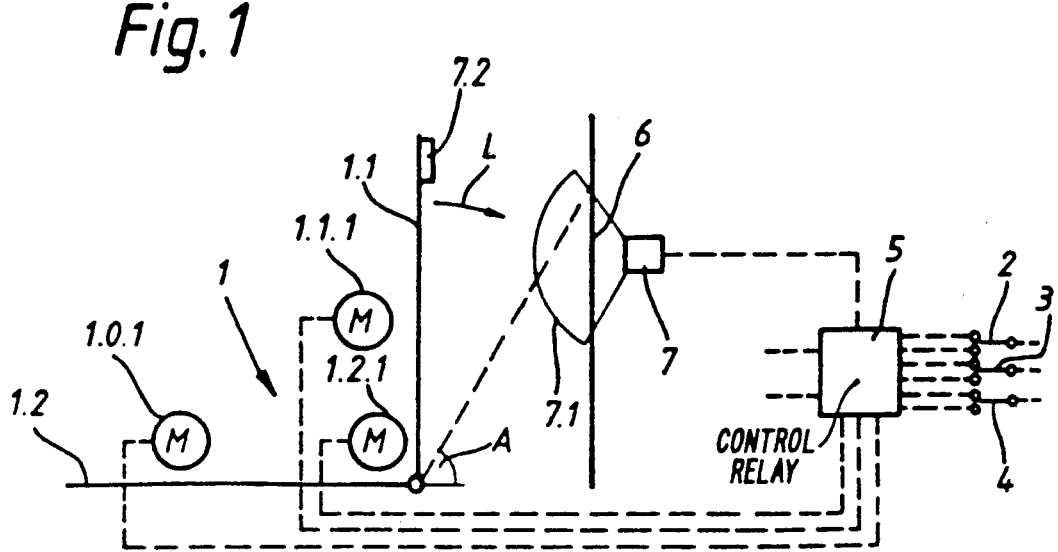
FIG. 1 is a schematic view of the motor vehicle seat control circuitry for the adjustment devices with the seat shown in an upright normal position.

Referring to FIG. 1, the schematically represented vehicle seat 1 has a seat back 1.1. and a seat cushion 1.2, to each of which an adjustment device 1.0.1, 1.1.1 and 1.2.1 is assigned. The adjustment devices can be selectively activated, with interconnection of a control relay 5, by positioning switching elements 2, 3 and 4. Positioning switching element 2 is assigned to seat-back adjustment device 1.1.1, positioning switching element 3 is assigned to longitudinal seat-adjustment device 1.0.1, and positioning switching element 4 is assigned to seat-cushion height adjustment device 1.2.1. An obstacle 6, for example the B-column or a hood compartment of the vehicle, is within the range of adjustment of the seat back 1.1.

A conventional switching device 7 of the type shown, for example in EP 191 272 A 1 can be constructed as an inductive proximity switch with an oscillatory circuit and arranged on this obstacle 6 in such way that a relatively large area of the longitudinal extension of the obstacle 6 lies in its magnetic field shown by the curved line 7.1. A metal foil 7.2 cooperates with the switching device 7 and is arranged as a damping mechanism in the upper rearward part of the seat back 1.1.

If a rearward tilting movement of the seat back 1.1 into a set position is now initiated in arrow direction L in FIG. 1 through positioning switching element 2, the metal foil 7.2 enters the magnetic field 7.1 shortly before the seat back 1.1 runs into the obstacle 6 and damps the oscillatory circuit of the switching device 7, which, as a consequence, changes its switched state. This switching signal brings about blocking, via the control relay 5, of the adjustment device 1.1.1, with the result that the seat back 1.1 maintains an angle of inclination and brings about activation of the longitudinal seat-adjustment device 1.0.1, with the result that the entire seat 1 is moved in arrow direction S a shown in FIG. 2.

Figure 3:
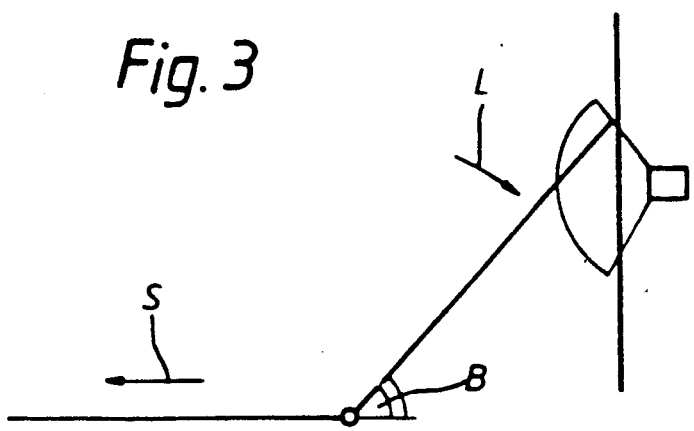
Figure 4:
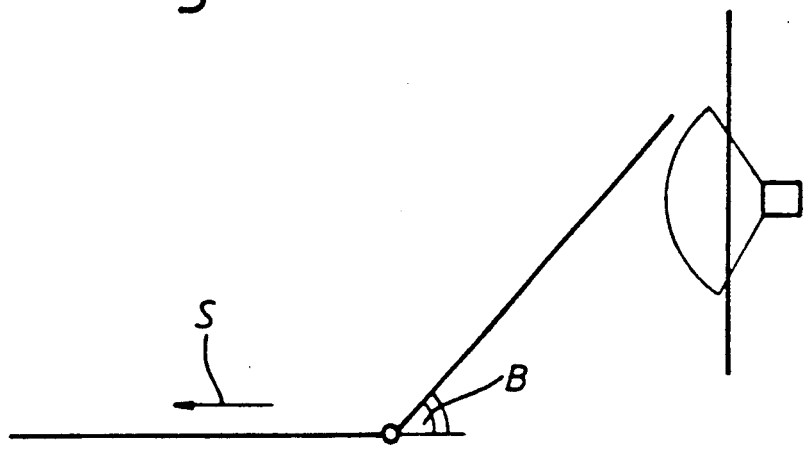
Figure 5:
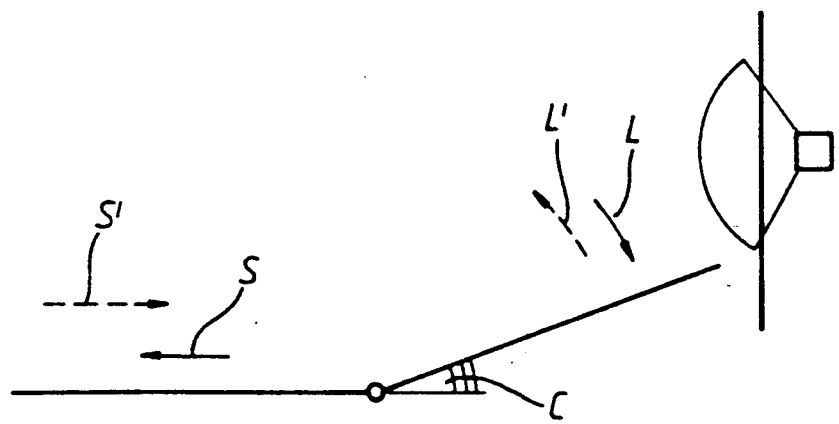

As can be further seen, during this movement S the seat back 1.1 and the metal foil 7.2 move out of the switching range 7.1 of the switching device 7 again, whereupon the switching device 7 again changes its switched state. The seat-back adjustment device 1.1.1 is activated again so that, in addition to the uninterrupted longitudinal movement of the seat in direction S, the seat back 1.1 is also moved further backwards in arrow direction L, as shown in FIG. 3. During this movement, however, the seat back 1.1 once again enters the switching range 7.1 of the switching device 7, which leads to blocking of adjustment device 1.1.1. The seat back 1.1. thus maintains the angle of inclination B while the entire seat 1 continues to be moved in direction S. During this movement, the seat back 1.1 moves out of the switching range 7.1 of the switching device 7 once again as seen in FIG. 4, whereupon the switching device 7 once again changes its switched state to activate the seat-back adjustment device 1.1.1. The result of these processes is that the seat-back 1.1 can approach its set lowered position with a desired angle of inclination C as seen in FIG. 5, whereupon the longitudinal seat-adjustment device 1.0.1 is switched off. If necessary, the entire seat 1 can then be moved further in the direction S by actuating positioning switching element 3 instead of element 2.

If, conversely, starting from the recumbent seat position shown in FIG. 5, a longitudinal rearward movement of the seat in direction S' (shown in dashed lines)

is initiated in positioning switching element 3, the metal foil 7.2 on the seat back 1.1 once again enters the magnetic field 7.1 shortly before the seat back runs into the obstacle 6, and damps the oscillatory circuit of the switching device 7, which then changes its switched state. Due to the actuation of positioning switching element 3, however, this switching signal now blocks, via the control relay 5, the longitudinal seat-adjustment device 1.0.1 and activates the seat-back adjustment device 1.1.1 which initiates a forward tilting movement of the seat back in direction L' (shown in dashed lines in FIG. 5). During this process, the seat back 1.1 moves out of the switching range 7.1 of the switching device 7 again, whereupon the switching device 7 changes its switched state again. The longitudinal seat-adjustment device 1.0.1 is thus activated again an in addition to the uninterrupted forward tilting movement L' of the seat back 1.1., the longitudinal rearward movement S' of the seat is continued once more.

The foregoing movements can be repeated until the desired longitudinal position of the seat 1 is reached, in which position the forward tilting movement of the seat back 1.1 is then also switched off. If necessary, the seat back 1.1 can then be brought into the desired position by actuating positioning switching element 2.

Figure 2:
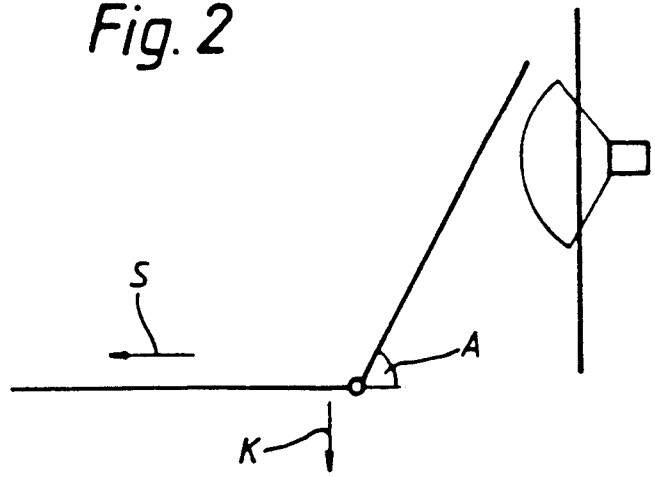
FIGS. 2 through 5 are further schematic views showing adjustment of the seat from the normal position of FIG. 1 to a recumbent position.

A similar procedure can also be adopted if —starting, for example, from the seat position in FIG. 2 —in the case of a downward movement of the rearward part of the seat cushion 1.2 in direction K initiated by positioning switching element 4, the concomitantly swivelling seat back 1.1 enters the switching range 7.1 of the switching device 7 shortly before running into the obstacle 6, in which case the switching device 7 changes its switched state. Due to the actuation of the positioning element 4, this changed switched stated blocks, via the control really 5, the seat-cushion height adjustment device 1.2.1 and activates the seat-back adjustment device 1.1.1 in a forward tilting movement of the seat back in direction L'. During this process, the seat back 1.1 likewise again moves out of the switching range 7.1 of the switching device 7 which then changes its switched state again. The seat cushion height adjustment device 1.2.1 is then activated again and, in addition to the uninterrupted forward tilting movement L of the seat back 1.1, the downward vertical movement K, of the seat cushion 1.2 is continued. Here too, these movements can be repeated until the set vertical position of the seat cushion 1.2 is reached, at which time the forward tilting movement of the seat back is then also switched off.

While a presently preferred embodiment of the invention has been shown and described, it will be appreciated that now, in light of what has been disclosed, changes and modifications thereto will be apparent to one skilled in this art without departing from the scope of the invention. Therefore, we do not intend to be limited to details shown and described herein but intend to cover any such changes and modifications as are encompassed by the scope of the appended claims.

We claim:

1. Method for controlling plural adjustment devices of a motor vehicle seat, which devices are assigned to the longitudinal movement of the seat and the tilting movement of the seat back and are activated by positioning switching elements so as to move the motor vehicle seat into specific, set positions in cooperation with switching apparatus operatively cooperating with the seat back to block the associated adjustment device before the seat back runs into an obstacle lying in a range of adjustment of the seat, comprising the steps of
   (a) initiating a rearward tilting movement of the seat back by one of the positioning switching elements;
   (b) blocking of the adjustment device for the rearward tilting movement shortly before the seat back runs into the obstacle;
   (c) moving the seat longitudinally forward automatically via the switching apparatus;
   (d) moving the seat back out of a switching range of the switching apparatus again and, in addition to the longitudinal movement of the seat, continuing the rearward tilting movement of the seat back either until the next time blocking occurs or until a set lowered position of the seat back is reached; and
   (e) stopping the longitudinal movement of the seat.

2. The method according to claim 1, further comprising the steps of (f) initiating a rearward longitudinal movement of the seat by another of the positioning switching elements, (g) blocking of the adjustment device for the rearward longitudinal movement shortly before the seat back runs into the obstacle, (h) moving the seat in a forward tilting movement of the seat back automatically via the switching apparatus, (i) moving the seat back out of the switching range of the switching apparatus again and, in addition to the tilting movement of the seat back, continuing the rearward longitudinal movement so the seat, either until the next time blocking occurs or until a set longitudinal position of the seat is reached, and (j) stopping the tilting movement of the seat back.

3. The method according to claim 1, further comprising the step of (f) initiating a downward movement of a rearward part of a seat cushion by yet another of the positioning switching elements (g) blocking of the adjustment device for the downward movement, shortly before the seat back runs into the obstacle, (h) moving the seat back in a forward tilting movement via the switching apparatus out of the switching range of the switching apparatus again and, in addition to the tilting movement of the seat back, continuing the downward movement either until the next time blocking occurs or until the set lowered position of the seat cushion is reached, and (i) stopping the tilting movement of the seat back.

4. The method according to claim 2, further comprising the step of (k) initiating a downward movement of a rearward part of a seat cushion yet another of the positioning switching elements (1) blocking of the adjustment device for the downward movement, shortly before the seat back runs into the obstacle, (m) moving the seat back in a forward tilting movement via the switching apparatus out of the switching range of the switching apparatus again and, in addition to the tilting movement of the seat back, continuing the downward movement either until the next time blocking occurs or until the set lowered position of the seat cushion is reached, and (n) stopping the tilting movement of the seat back.

5. The method according to claim 1, wherein the step in blocking of the adjustment device shortly before the seat back runs into the obstacle includes damping of the switching apparatus arranged on the obstacle and comprising an inductive proximity switch by a component arranged in an upper region of the seat back and facing the switching apparatus, and shifting the switching apparatus into a switched state.

* * * * *